H. C. CROWELL.
Shaft and Pulley Coupling.

No. 208,965.  Patented Oct. 15, 1878.

Witnesses,
Jas. T. Miller
Jno. J. Love

Inventor,
Hiram C. Crowell
Per Jno. K. Hallock
Att'y.

UNITED STATES PATENT OFFICE.

HILEN C. CROWELL, OF ERIE, PENNSYLVANIA, ASSIGNOR TO A. H. GRAY, OF SAME PLACE.

IMPROVEMENT IN SHAFT AND PULLEY COUPLINGS.

Specification forming part of Letters Patent No. 208,965, dated October 15, 1878; application filed May 8, 1878.

*To all whom it may concern:*

Be it known that I, HILEN C. CROWELL, of Erie, in the county of Erie and State of Pennsylvania, have invented a new and useful Shaft and Pulley Coupler; and I do hereby declare the following to be a full, clear, and exact description thereof.

My invention consists in providing a device for coupling machinery-shafting and for attaching pulleys thereto.

Figure 1:
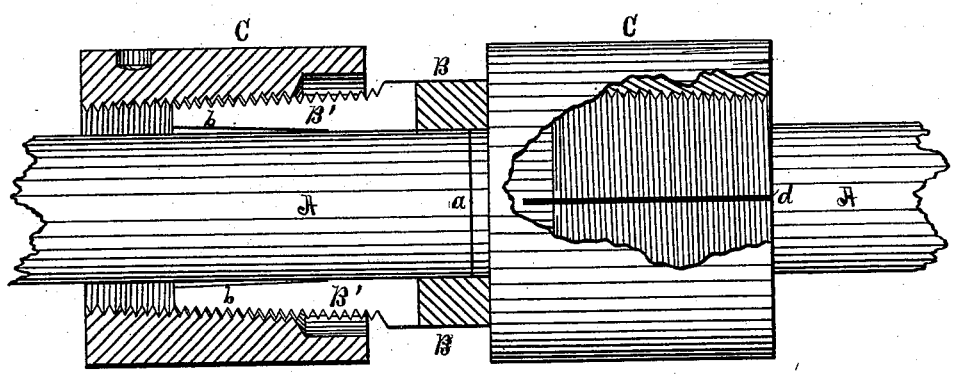
Figure 2:
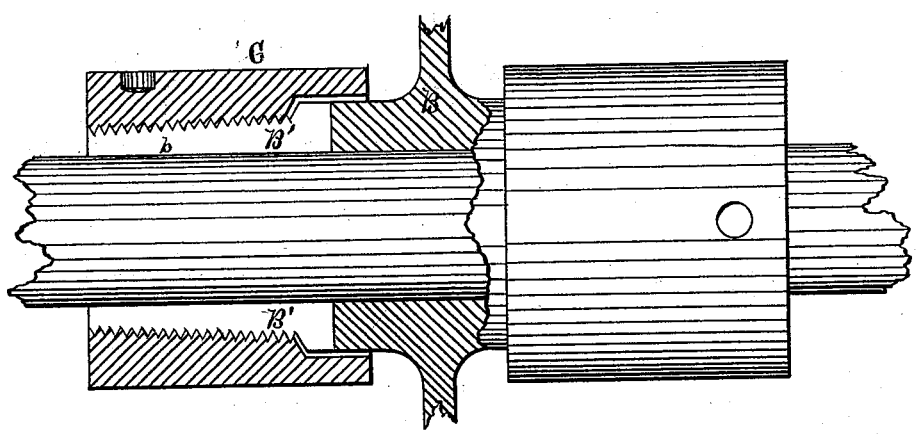

My device is shown in the accompanying drawing as follows:

Figure 1 shows the device in use as a coupling, and Fig. 2 shows it as a pulley-fastener. The construction in either case is the same, except that in Fig. 2 the sleeve shown in Fig. 1 is part of the hub of the pulley.

In these figures the parts are shown in elevation on the right and in section on the left. In Fig. 2 the device is shown as set, while on the left of Fig. 1 it is shown as loose.

The principle on which my device is constructed is that of a slotted taper sleeve and jam-nuts.

I am aware that shafting has been heretofore coupled and pulleys have been fastened to shafting by the use of taper sleeves and jam-nuts.

My invention consists wholly in form of sleeve and nut used, and the construction and operation of the same, which are as follows:

A A are the shafts, meeting at $a$ in the middle of the sleeve B. This sleeve is provided with an outer and an inner taper. B' is the outer taper, and it is screw-threaded. $b$ is the inner taper. This inner taper, $b$, is about two-thirds the length of the outer taper. It is very slight—less in fact than the drawing represents. The tapered portion of the sleeve B is slotted by kerfs $d$, dividing it into tongues.

The section on the left of the figures is taken through these kerfs, and in Fig. 1 part of the jam-nut C is broken away on the right of the figure, so as to show the kerf. The jam-nut has a tapering bore. The angle of taper in the nut is equal to the sum of the angles of the outer and inner tapers of the sleeve. The result of this construction is, that when the jam-nut C is screwed up, as shown on the left of Fig. 2, the taper face $b$ is set down snug upon the shaft. Right here appears the object of this inside taper, $b$, which is to obtain a long bearing of the sleeve upon the shaft. The sleeve B must have a sufficient caliber to admit the shaft A. If there were no inner bevel or taper, the jam-nut would cause the tongues to press upon the shaft only for a short distance at the end; but by my construction a long bearing is obtained, and consequently the coupling will bear greater strain.

As in all taper-sleeve connections, the shafting and pulleys are concentric when coupled or adjusted.

What I claim as new is—

1. The sleeve or hub B, with its ends tapered externally and internally and slotted, as described, in combination with jam-nuts C C, which are provided with tapered bores, substantially as and for the purposes mentioned.

2. A taper-sleeve fastening provided with both an external and an internal taper, B' and $b$, and kerfs $d$, substantially as and for the purposes mentioned.

In testimony whereof I, the said HILEN C. CROWELL, have hereunto set my hand.

HILEN C. CROWELL.

Witnesses:
 JNO. K. HALLOCK,
 A. H. GRAY.